Sept. 19, 1939.   A. E. SIDNELL   2,173,734
RUBBER GLOVE OR LIKE ARTICLE AND METHOD FOR MAKING THE SAME
Filed Nov. 10, 1937
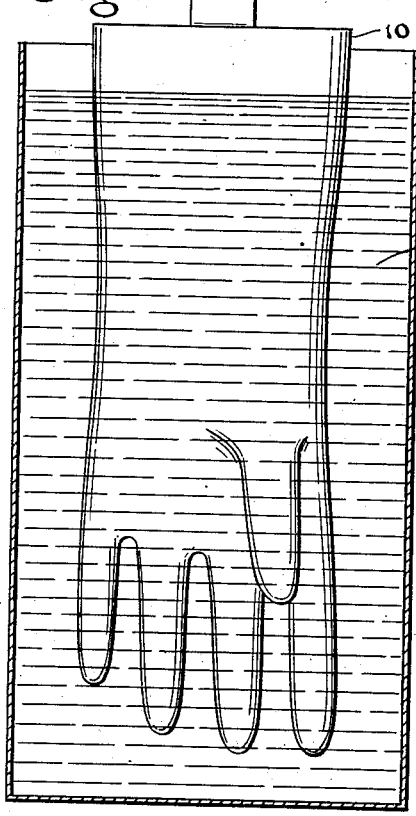
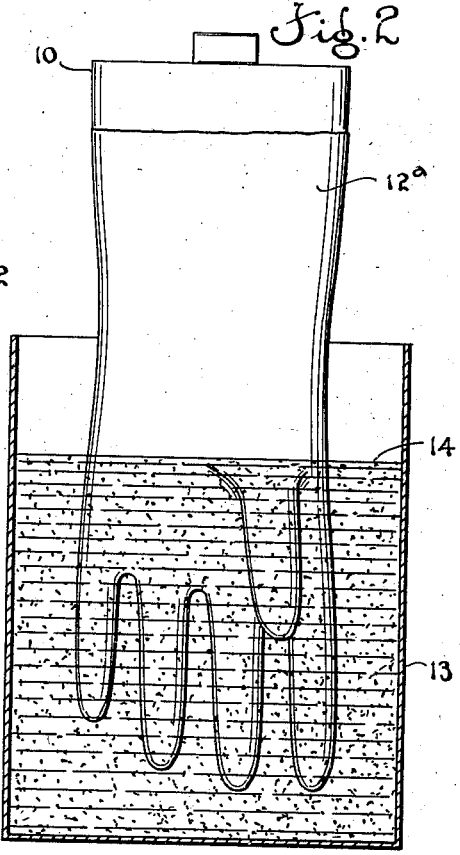
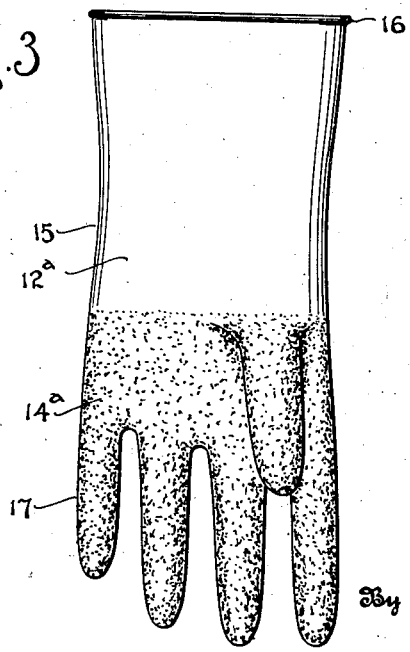
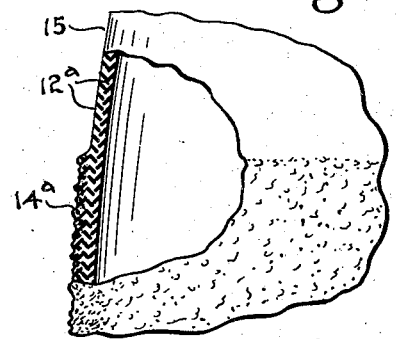
Inventor
Albert E. Sidnell
By Ralph Barrow,
Attorney Patented Sept. 19, 1939

2,173,734

UNITED STATES PATENT OFFICE

2,173,734

RUBBER GLOVE OR LIKE ARTICLE AND METHOD FOR MAKING THE SAME

Albert E. Sidnell, Akron, Ohio, assignor to Seiberling Latex Products Company, Barberton, Ohio, a corporation of Ohio Application November 10, 1937, Serial No. 173,866

2 Claims. (Cl. 18—58)

The general purpose of the present invention is to provide an improved rubber glove made of liquid latex or similar dispersions of rubber in water and to provide a simple, economical method for making the same.

Rubber gloves and like rubber articles with crinkled or roughened gripping portions have heretofore been made of rubber cements effectively by the methods disclosed in United States Patents No. 1,983,963 and No. 2,064,143. Liquid latex is being used extensively, now, for making rubber gloves, but so far no entirely satisfactory glove and method have been produced to provide an effective roughened glove using liquid latex.

The specific purpose of the present invention is to provide an improved glove or like article made of liquid latex and having a roughened portion and to provide an easy and inexpensive method for producing such articles.

The foregoing and other purposes of the invention are attained in the glove and by the method illustrated in the accompanying drawing and described below. It is to be understood that the invention is not limited to the specific form thereof shown and described.

Of the accompanying drawing:

Figure 1 is a view illustrating a glove form being dipped into a tank containing liquid latex to produce, by one or more dippings a smooth deposit of rubber on the form.

Figure 2 is a view similar to Figure 1 illustrating a partial dipping of the form to provide a roughened gripping portion on the glove using liquid latex containing a granular material such as ground vulcanized rubber.

Figure 3 is a view of the finished glove, partly broken away and in section.

Figure 4 is a greatly enlarged fragmentary view, partly broken away, of a portion of the glove shown in Figure 3.

Referring to the drawing, the numeral 10 designates a glove form of a known type for use in making rubber gloves by dipping. A tank 11 is provided containing any desired composition of liquid latex 12 or other similar water dispersions of rubber or the like and into which form 10 may be dipped one or more times with intermediate dryings or coagulations of the rubber on the form.

A second tank 13 may be provided in which is a suitable liquid latex composition 14 in which is suspended a granular material such as ground vulcanized rubber. It is desirable, to produce uniform results, that this granular material should not have too much variance in particle size and 20 to 24 mesh granular rubber is preferred and also granular material of a specific gravity is preferred which together with the effect of surface tension will remain suspended in the liquid latex without either floating to and agglomerating at the top or settling to the bottom. The specific gravity of the granular rubber is therefore determined somewhat lower (on account of surface tension) than the specific gravity of the particular liquid latex composition used.

A specific liquid latex composition suitable for the purpose comprises:

Liquid latex (with usual compounding and vulcanizing ingredients) Sp. G. 1, 100 parts by weight.

Granular rubber 4 mesh, Sp. G. 1.23, 10 parts by weight.

The form 10 is shown being dipped in such a composition 14 in tank 13 to provide a roughened portion on the glove.

In carrying out the method, form 10 is first dipped in tank 11 one or more times as described, depositing smooth layers 12ª, 12ª of rubber, then the form is so dipped as to deposit a layer 14ª of composition 14 on the finger portions thereof, the finger portions being dipped in downwardly extending positions so that the latex composition 14 can flow about and between the fingers uniformly to distribute the roughening particles about the surfaces of the fingers.

The finished glove is shown at 15 in Figure 3. The bead has been rolled thereon as at 16 and the roughened outer layer over the finger portions appears at 17. It will be noted that the main body of the glove is smooth with an inside smooth surface comfortable to the wearer. The gripping portion is reinforced by the additional rough layer in which the granular particles of vulcanized rubber provide effective gripping protuberances.

Modifications of the invention may be resorted to without departing from the spirit thereof or the scope of the appended claims.

What is claimed is:

1. That method for making rubber gloves or the like, which comprises forming a smooth body portion for the glove including thumb and fingers by depositing one or more layers of liquid latex on a form, and forming over a portion of the gloves, including surfaces of the fingers and thumb, roughened surfaces or gripping surfaces, by depositing a layer of liquid latex containing a granular material distributed therein in homogeneous mixture over the said portion of the gloves, said last-named layer being deposited by dipping the forms with fingers extending downwardly whereby the latex will flow uniformly about and between the fingers and vulcanizing the gloves.

2. A rubber glove comprising a body portion formed by a deposit of one or more layers of liquid latex so as to have smooth surfaces, said glove having an additional layer of liquid latex deposited upon a portion thereof including the thumb and fingers, which additional layer contains homogeneously mixed therein a granular material providing gripping protuberances over said portion of the glove, and said granular material being uniformly distributed about and between the surfaces of the fingers.

ALBERT E. SIDNELL.